United States Patent [19]

Gandini

[11] Patent Number: 4,887,410
[45] Date of Patent: Dec. 19, 1989

[54] PROCESS AND APPARATUS FOR THE PRODUCTION OF PACKAGES OF COSMETIC PRODUCTS WITH POWDERS OF DIFFERENT CHARACTERISTICS

[75] Inventor: Luigi Gandini, Cavenago Brianza, Italy

[73] Assignee: Dosa-Pack S.R.L., Italy

[21] Appl. No.: 207,297

[22] Filed: Jun. 15, 1988

[30] Foreign Application Priority Data

Jul. 20, 1987 [IT] Italy ................ 21352 A/87

[51] Int. Cl.$^4$ ................................ B65B 1/24
[52] U.S. Cl. ................ 53/436; 53/237; 53/474; 53/527; 141/9; 141/12; 141/80; 141/105; 425/356; 425/431; 425/443; 425/447
[58] Field of Search ........ 53/436, 474, 473, 527, 53/523, 237; 100/918; 141/12, 9, 105, 80; 426/249, 285, 512; 264/113, 245, 120, 254, 267, 268; 425/131.1, 130, 441, 443, 425, 431, 434, 448, 449, 447, 356

[56] References Cited

U.S. PATENT DOCUMENTS

| | | | |
|---|---|---|---|
| 682,243 | 9/1901 | Cuscaden et al. | 53/237 |
| 1,442,820 | 11/1923 | Percy | 53/237 X |
| 1,547,260 | 7/1925 | Nighthart | 425/356 X |
| 1,627,853 | 5/1927 | Kuhn | 53/154 |
| 2,145,240 | 1/1939 | Adams | 141/9 |
| 2,365,920 | 12/1944 | Vaughn | 53/436 |
| 2,365,922 | 12/1944 | Vaughn | 53/428 |
| 2,603,927 | 7/1952 | Grey | 53/527 |
| 2,731,777 | 1/1956 | Wollersheim | 53/436 |
| 2,763,973 | 9/1956 | Atkins | 53/436 |
| 3,405,744 | 10/1968 | Bowman | 53/527 X |
| 3,877,862 | 4/1975 | Murray | 425/448 |
| 4,050,865 | 9/1977 | Drostholm et al. | 264/120 X |
| 4,390,488 | 6/1983 | Wessel | 264/120 X |
| 4,666,723 | 5/1987 | Invernizzi et al. | 53/237 X |

Primary Examiner—James F. Coan
Attorney, Agent, or Firm—Steele, Gould & Fried

[57] ABSTRACT

The process has a first phase of temporary subdivision of a container in a plurality of sectors, each assigned to contain a powder of different characteristics, through means of temporary subdivision, a second phase of filling such sectors, a third phase of partial pressing operation of such powders, a fourth phase for removing said means of temporary subdivision and a fifth phase of final pressing. The above process is executed with an apparatus including a frame which, by means of tubular cells, defines said subdivision sectors of the container. Said cells are connected to means for the feed and the controlled delivery of said powders and pressing pistons translate in them.

5 Claims, 3 Drawing Sheets

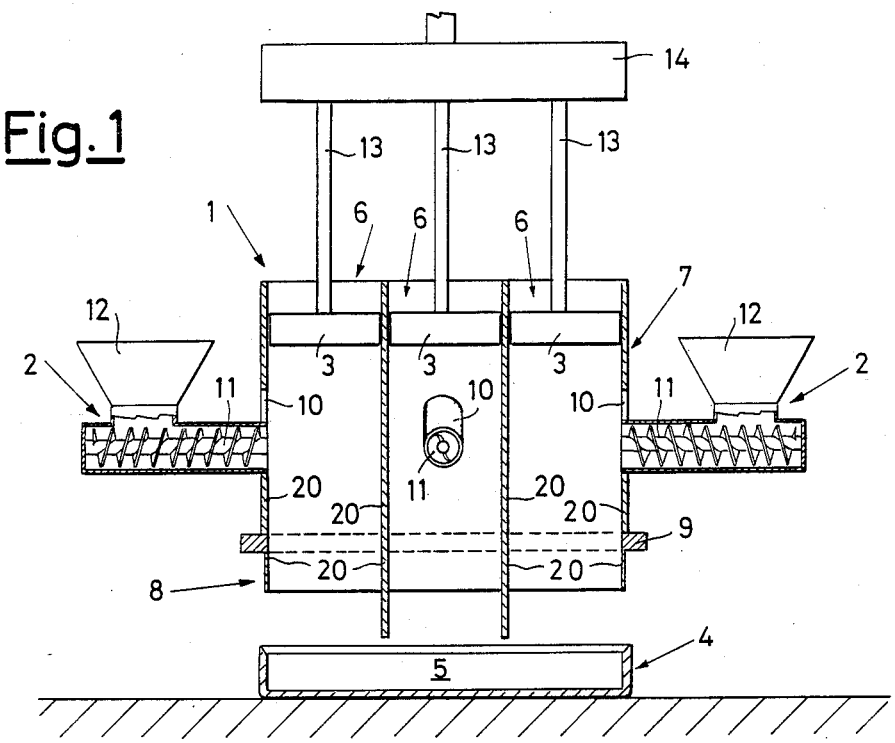
Fig. 1
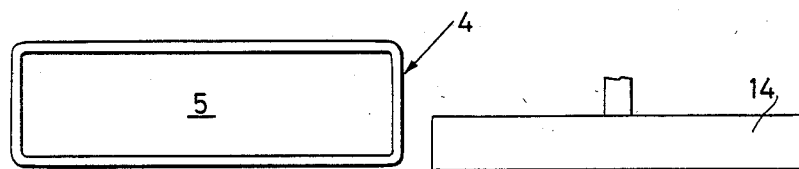
Fig. 2
Fig. 3

PROCESS AND APPARATUS FOR THE PRODUCTION OF PACKAGES OF COSMETIC PRODUCTS WITH POWDERS OF DIFFERENT CHARACTERISTICS

BACKGROUND OF THE INVENTION

1. Field of the Invention

The present invention is concerned with a process and an apparatus for the production of packages of cosmetic products with powders of different characteristics.

2. Prior Art

Packages of cosmetic products consisting of a plurality of metal bases each containing a different powder are well-known. Such packages are obtained by filling the individual bases and then collecting them next to each other in a common container. This production method has several drawbacks and disadvantages, among them: the impossibility of filling all the bases in an identical manner, the limited possibility of varying the shape of the container of the bases, the difficulty of accurately placing next to each other and introducing the different bases into the container, because inevitably the bases are not perfectly identical, and the impossibility of executing integrally all the packaging operations in an automatic manner.

SUMMARY OF THE INVENTION

In view of this state of the art, a main object of the present invention is to accomplish a process for the production of packages of cosmetic products with powders of different characteristics in which the above drawbacks are eliminated or considerably reduced.

A further object is to accomplish an apparatus which will execute the above process.

According to the invention the main object is accomplished with a process for the production of packages of cosmetic products with powders of different characteristics characterized in that it has a first phase of temporary subdivision of a container in a plurality of sectors, each assigned to contain a powder of different characteristics, through means of temporary subdivision, a second phase of filling such sectors with cosmetic powders, a third phase of partial pressing of such powders, a fourth phase for removing said means of temporary subdivision from said container and a fifth phase of final pressing of the powders contained in the container.

With this process, the bases to be introduced into the container are first of all eliminated and a uniform pressing of the powder is obtained and thus a uniform filling of the container. In addition, given the simplicity of the operations the production of the packages of such cosmetic products can be completely automated.

The further object is attained by an apparatus which can execute the above process characterized in that it includes a movable frame with a height that is much greater than the height of a container to be filled with cosmetic powders and having a peripheral outline which coincides with the outline of a storage cavity of the powders of the container, which frame is subdivided into a plurality of tubular cells each of which is connected to means for the feed and the controlled delivery of a cosmetic powder and in which cells translate pistons for pressing the cosmetic powders.

Said pistons execute a first partial pressing operation of the powders while for the final pressing operation there is a pressing piston having a peripheral outline which almost coincides with the outline of the storage cavity for the container's powders.

As the shape of the described frame varies containers of widely different shapes can be filled, subdivided into a plurality of sectors defined by the pressed powders, which in turn can be of different shapes.

BRIEF DESCRIPTION OF THE DRAWINGS

One possible embodiment of the present invention is illustrated, as a non-limiting example, in the enclosed drawings, in which:

FIG. 1 shows an apparatus for the execution of the process according to the invention, in a front, partially-sectioned view;

FIG. 2 shows a container for cosmetic products seen in a plan from above;

FIGS. 3 to 7 show the subsequent phases of the above process;

DETAILED DESCRIPTION OF THE PREFERRED EMBODIMENTS

Figure 4:
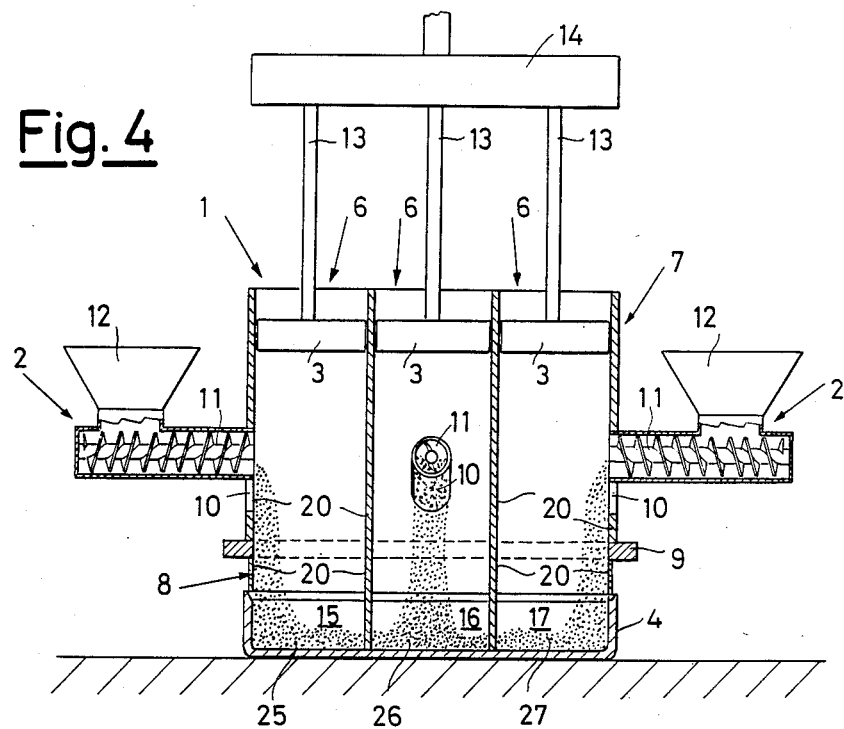

With reference to FIG. 1, an apparatus is shown which can accomplish the filling of a container of cosmetic products comprising a movable frame 1, means for the feed and delivery 2 of the cosmetic powders connected to said frame and pressing pistons 3 sliding in said frame for partially pressing the powders in a lower container 4 (FIG. 2).

The frame 1 has a peripheral outline which almost coincides with the outline of the cavity 5 of the container 4 and has a height which is considerably greater than the height of the container. The frame 1 is preferably constituted by an upper portion 7 and a replaceable lower portion 8 connected by means of a flange 9. The lower portion 8, pressed against the bottom of a container to be filled, is subjected to considerable wear and its replacement is therefore necessary after a certain number of filling cycles.

The portions 7 and 8 define with the dividing walls 20 a plurality of tubular cells 6, whose upper part serves as a conveyancing channel of the powders and as a sliding guide for the pressing pistons 3 and whose lower part serves as a temporary means of containment and separation of the powders poured into the cavity 5 of the container 4. Each of the tubular cells is equipped with an opening 10 for the introduction of an auger 11 connected to a hopper 12. The opening 10 is of a dimension which will allow the vertical translation of the frame 1 without having to withdraw the auger 11.

The pressing pistons 3 slide within the tubular cells 6 and their section has a shape which coincides substantially with that of said cells 6. Said pistons 3 are integral by means of the corresponding rods 3 with a common plate 14 connected to an appropriate operating means.

The apparatus is equipped with a further pressing piston 30 with a peripheral outline which almost coincides with the outline of the cavity 5 of the container 4 and whose object will be explained later.

The apparatus is also equipped with known means for raising and lowering the frame 1 with respect to the container 4.

The augers 11 with their corresponding hoppers 12 are arranged in a fixed position with respect to the movable frame 1 and can be moved away from it for cleaning and maintenance operations.

With the apparatus described herein the following process is executed for the production of cosmetic products with different pwoders according to the invention.

The position at rest of the apparatus is that shown in FIG. 1 in which the frame 1 is raised above a container 4.

As shown in FIG. 3, the first phase of the process consists in lowering the frame 1 into the cavity 5 of the container 4, so that adjacent sectors 15, 16 and 17 are defined.

Figure 5:
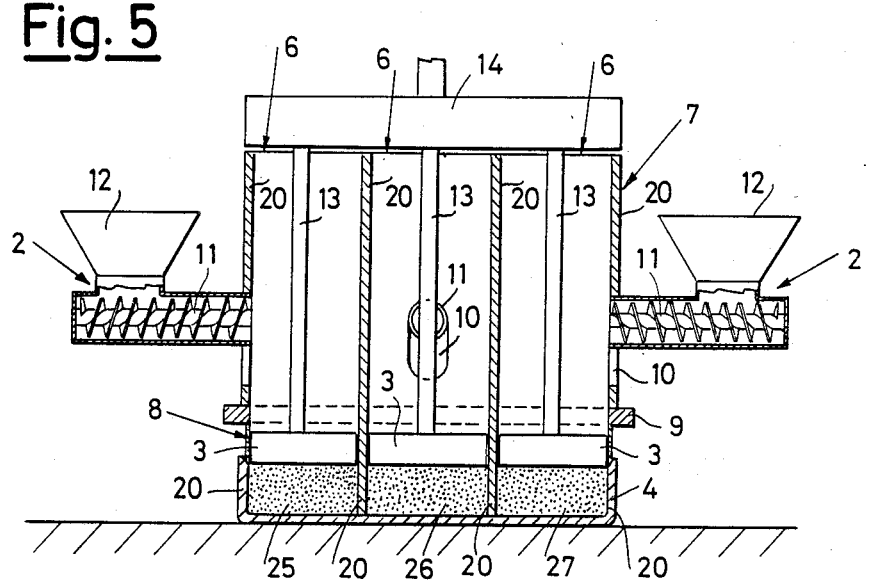

When the augers 11 are operated the powders 25, 26 and 27 with different characteristics are fed into the corresponding sectors 15, 16 and 17 (FIG. 5). The augers are operated for the time required to feed a preselected quantity of such powders.

At this point, the pressing pistons 3 are activated to press a uniform layer of the powders 25, 26 and 27 until almost all the space of the sectors 15, 16 and 17 is occupied. The pressing operation at this point is not exerted with the greatest force, but it is executed to a degree which will confer to the powders the necessary compactness for undergoing the subsequent phases of the process.

The ensuing phase is the removal of the frame 1, which is raised to the starting point shown in FIG. 1, above the filled container 4.

Figure 6:
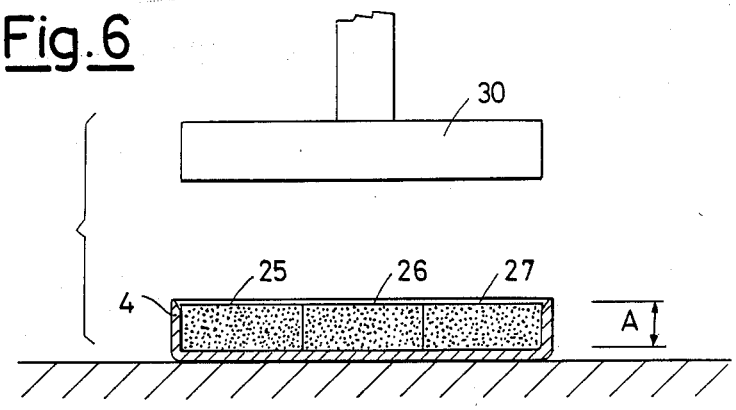
Figure 7:
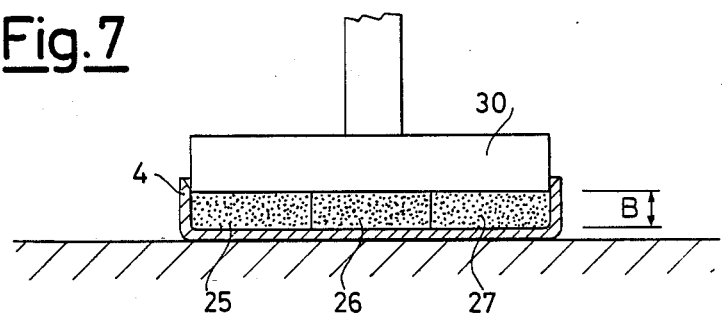

The latter, which has a layer of powders 25, 26 and 27 with a thickness A, is placed (FIG. 6) opposite a pressing piston 30 which executes the final pressing operation of the powders (FIG. 7) for filling the spaces previously occupied by the walls 20 of the frame 1 and for further compressing the powders, obtaining a layer of powders with a thickness B with the required compactness.

Figure 8:
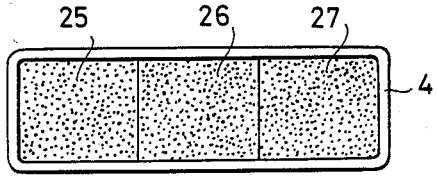
FIG. 8 shows a package of a cosmetic product obtained by using the apparatus shown in FIG. 1, seen in a plan from above.

The container 4, as shown in FIG. 8, now holds the powders 25, 26 and 27 with different characteristics and which are distinguishable by their colour well pressed with a uniform thickness and with clear lines of separation.

The rectangular shape of the container 4 and its filling with three types of powders are purely indicative. With the process described and using an apparatus whose frame 1 and pistons 3 are appropriately shaped, containers may be filled with cavities of another shape, for example circular, semi-circular, polygonal, etc. in which the sectors defined by the compacted powders have different shapes, for example circular, triangular, rectangular, square, etc..

I claim:

1. Process for production of packages of cosmetic products with powders of different characteristics, comprising the steps of:
    temporarily subdividing a container into a plurality of sectors, each of the sectors being assigned to contain a powder, including powders of different characteristics, by placing into the container a means of temporary subdivision;
    filling such sectors with said powders;
    partially pressing such powders;
    removing said means of temporary subdivisio from the container; and,
    finally pressing the powders contained in the container.

2. Apparatus for producing packages of cosmetic products by temporarily subdividing a container during loading and packing steps, comprising:
    a movable frame with a height that is much greater than the height of a container to be filled with cosmetic powders and having a peripheral outline which coincides with the outline of a storage cavity for the powders of the container, which frame is subdivided into a plurality of tubular cells, each cell being connected to means for feed and controlled delivery of a cosmetic powder and in which translate pressing pistons, said apparatus further comprising a further pressing piston with a peripheral outline which almost coincides with the outline of the cavity of the container.

3. Apparatus according to claim 2, wherein said frame is formed by an upper portion and by a replaceable lower portion connected by means of a flange.

4. Apparatus according to claim 2, wherein said tubular cells are equipped with an aperture which allows the passage of said feed and controlled delivery means of the powders even during the translation of said frame.

5. Apparatus according to claim 2, wherein said feed and controlled delivery means of a cosmetic powder are constituted by an auger connected to a hopper.

* * * * *

UNITED STATES PATENT AND TRADEMARK OFFICE
CERTIFICATE OF CORRECTION

PATENT NO. : 4,887,410

DATED : December 19, 1989

INVENTOR(S) : Gandini

It is certified that error appears in the above-identified patent and that said Letters Patent is hereby corrected as shown below:

Column 3, line 5, delete "pwoders" and insert --powders--.

Column 4, line 16, delete "subdivisio" and insert --subdivision--.

Signed and Sealed this

Twenty-fifth Day of December, 1990

Attest:

HARRY F. MANBECK, JR.

*Attesting Officer*         *Commissioner of Patents and Trademarks*